United States Patent [19]

Takahashi

[11] 4,236,953

[45] Dec. 2, 1980

[54] PROCESS FOR PRODUCING THERMOPLASTIC MULTI-WALLED PIPES

[75] Inventor: Keiichi Takahashi, Ichikawa, Japan

[73] Assignee: Tokan Kogyo Co., Ltd, Tokyo, Japan

[21] Appl. No.: 962,781

[22] Filed: Nov. 21, 1978

Related U.S. Application Data

[62] Division of Ser. No. 800,427, May 25, 1977, Pat. No. 4,157,194.

[30] Foreign Application Priority Data

| May 27, 1976 | [JP] | Japan | 51/67004 |
| Jun. 6, 1976 | [JP] | Japan | 51/71575 |
| Jul. 1, 1976 | [JP] | Japan | 51/77054 |
| Jul. 1, 1976 | [JP] | Japan | 51/77055 |
| Jul. 6, 1976 | [JP] | Japan | 51/79518 |
| Feb. 18, 1977 | [JP] | Japan | 52/16117 |

[51] Int. Cl.² .................. B29D 23/04; F16L 39/00; F16L 47/02
[52] U.S. Cl. .................. 156/244.13; 156/244.15; 156/244.22; 264/173; 264/209; 264/514; 264/515
[58] Field of Search .................. 156/244.12, 244.13, 156/244.15, 244.22; 264/512, 514, 515, 541, 176 R, 209, 173; 425/133.1; 285/3, 4, 47, 133 R, 133 A, 138, 332, 423, DIG. 16; 138/148, 109, 113, 114

[56] References Cited

U.S. PATENT DOCUMENTS

| 2,551,710 | 5/1951 | Slaughter | 285/1.33 R |
| 2,956,586 | 10/1960 | Zeigler et al. | 285/133 R |
| 3,274,315 | 9/1966 | Kauamera | 264/209 |
| 3,552,779 | 1/1971 | Henderson | 285/133 R |
| 3,758,354 | 9/1973 | Sakuigi et al. | 156/244.14 |
| 4,149,739 | 4/1979 | Morris | 285/133 R |

Primary Examiner—Caleb Weston
Attorney, Agent, or Firm—Charles E. Brown

[57] ABSTRACT

Thermoplastic multi-walled pipe which has at least two tubular members different in inside diameter and concentrically arranged, these tubular members being spaced and supported by a plurality of ribs so as to provide hollow portions therebetween. The bond strength between the inner end surface of the rib and the tubular member supported thereby is less than that between the outer end surface of the rib and the tubular member supported thereby, so the exposure of the inner tubular member is easily achieved by means of an external force. After exposing the inner tubular member these multi-walled pipes are conveniently connected together by using a joint composed of a tubular part having the same inside diameter as the inner tubular member of the multi-walled pipe and a flange provided at one end of the tubular part concentrically therewith and having the same outside diameter as the multi-walled pipe, and in addition the hollow portion of the thermoplastic multi-walled pipe is kept sealed by the action of the flange.

8 Claims, 27 Drawing Figures

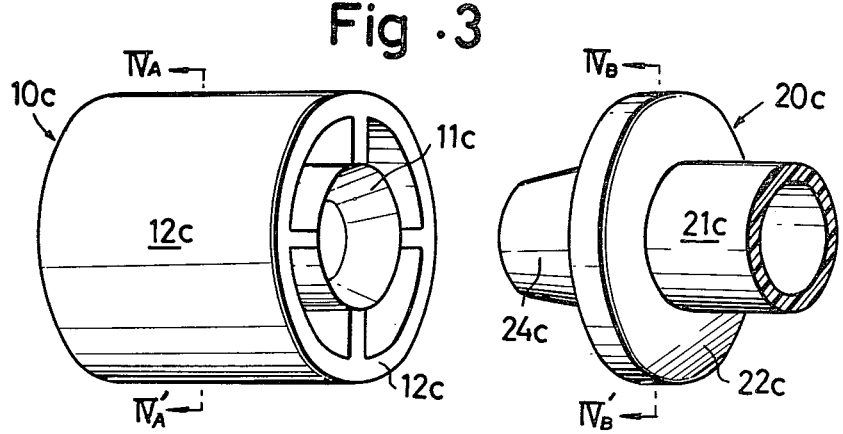
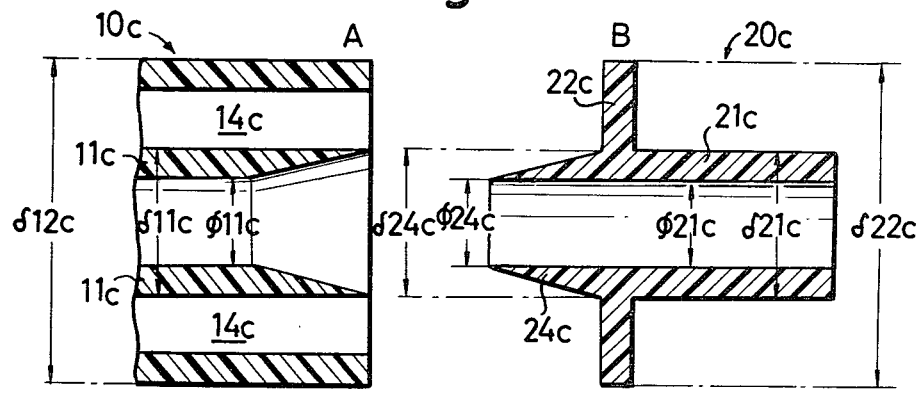
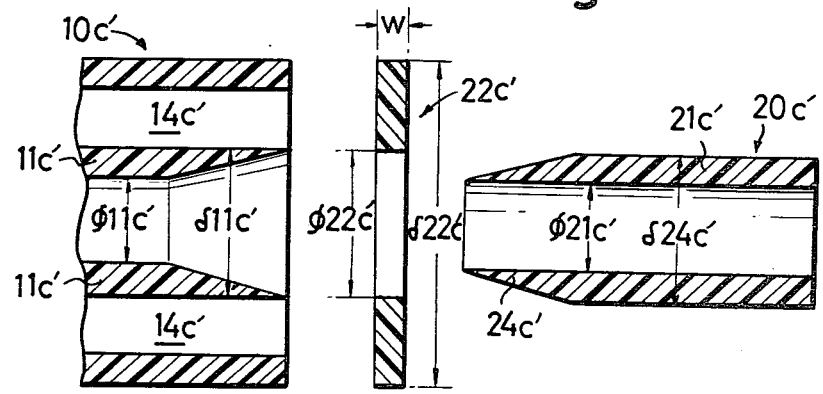

PROCESS FOR PRODUCING THERMOPLASTIC MULTI-WALLED PIPES

This is a division of application Ser. No. 800,427 filed May 25, 1977 now U.S. Pat. No. 4,157,194, granted June 5, 1979.

BACKGROUND OF THE INVENTION

1. Field of the Invention

The present invention relates to a thermoplastic multi-walled pipes and a process for producing the same, and more particularly to thermoplastic multi-walled pipes each composed of two or more tubular members different in inside diameter concentrically arranged with a hollow portion therebetween.

2. Description of the Prior Art

It has been well known for many years that the thermoplastic multi-walled pipe composed of two or more tubular members different in inside diameter concentrically disposed with a hollow portion therebetween is excellent in heat insulation property because of its hollow portion or portions. However, such multi-walled pipes have hardly been brought into practical use, because because it has been difficult to join them to the conventional single wall pipe by such as sockets, elbows, Tee joints, etc.

SUMMARY OF THE INVENTION

It is the primary object of the present invention to provide thermoplastic multi-walled pipes, which enables one to join the pipes easily and quickly.

According to one aspect of the present invention, a multi-walled pipe is stripped, at its one end by a predetermined length, of its tubular members and tubular-member-supporting ribs except for the innermost tubular member so as to expose the innermost tubular member, and in addition a joint is provided which consists of a tubular part to be connected to the above exposed innermost tubular member of the multi-walled pipe and a flange is provided at one end of the above tubular part concentrically therewith for receiving the above exposed tubular member and closing the open end of the multi-walled pipe between its outermost wall and the exposed innermost tubular member. Multi-walled pipes can be assembled into a line by connecting the above joint to each end of the multi-walled pipe.

BRIEF DESCRIPTION OF THE DRAWINGS

FIG. 3 is a perspective view of a joint structure according to still another embodiment of the present invention;

FIG. 4 is a sectional view taken along Line IIII—IIII' of FIG. 3;

FIG. 5 is a sectional view of a modification of the embodiment shown in FIG. 4;

DESCRIPTION OF THE PREFERRED EMBODIMENTS

Now the present invention will be hereinafter described with reference to the accompanying drawings.

Figure 1:
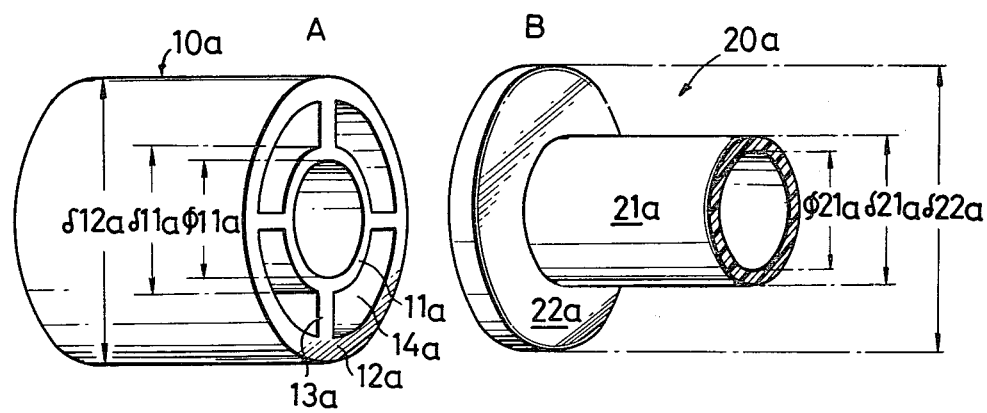
FIG. 1 is a perspective view of thermoplastic multi-walled pipes according to one embodiment of the present invention and a joint for connecting the pipes.

Reference is now made to FIG. 1 which shows an embodiment of the present invention. Reference numeral 10a designates a multi-walled pipe, 11a an inner tubular member, 12a an outer tubular member, 13a ribs, 14a a hollow portion, 20a a joint, and 21a a tubular part of the joint member 20a. The tubular part 21a of the joint member 20a is so made that its inside diameter $\phi_{21a}$ and outside diameter $\delta_{21a}$ are equal to the inside diameter $\phi_{11a}$ and outside diameter $\delta_{11a}$ of the inner tubular member 11a of the multi-walled pipe 10a. Numeral 22a designates a flange provided at the end of the tubular part 21a concentrically therewith and is so made that its outside diameter $\delta_{22a}$ is equal to the outside diameter $\delta_{12a}$ of the multi-walled pipe 10a. The joint 20a may be connected to the multi-walled pipe 10a by mating the surface B of the flange 22a with the surface A of one end of the multi-walled pipe 10a.

According to the above embodiment of the present invention, if the flange surface B of the joint 20a and one end structure A of the multi-walled pipe 10a are mated and bonded with each other, the hollow portion 14a between the inner and outer tubular members, 11a and 12a respectively, can be easily closed and, in addition, the inner tubular member 11a of the pipe 10a can be easily connected to the tubular part of the joint 20a. The tubular part 21a of the joint 20a is single-walled, and therefore may be used in combination with sockets, elbows, tee joints, etc. thereby enabling connection of multi-walled pipes.

In the above embodiment, as mentioned above, the tubular part 21a of the joint 20a is so made that its outside diameter $\delta_{21a}$ and inside diameter $\phi_{21a}$ are equal to the outside diameter $\delta_{11a}$ and inside diameter $\phi_{11a}$ of the inner tubular member 11a. However, the object of the present invention may be achieved if the inside diameter $\phi_{11a}$ of the inner tubular member 11a of the multi-walled pipe 10a is equal to the inside diameter $\phi_{21a}$ of the tubular part 21a of the joint 20a.

Figure 2:
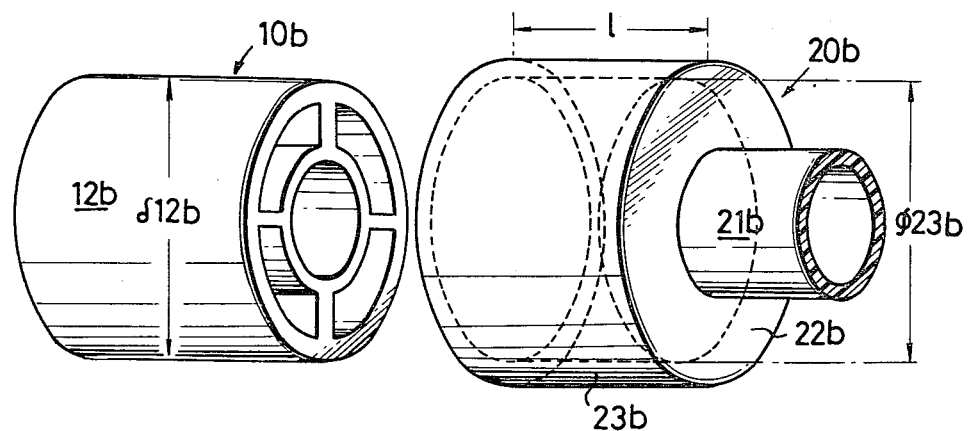
FIG. 2 is a perspective view of a thermoplastic multi-walled pipe joint according to another embodiment of the present invention.

Reference is now made to FIG. 2 which is a perspective view of another embodiment of the present invention. In the drawing, the reference numeral 20b is a joint, 21b a tubular part of the joint 20b, and 22b is a flange of the tubular part 21b. To the flange 22b is connected a short tubular member 23b with a length of l is connected to the flange 22b. Its inside diameter $\phi_{23b}$ is equal to the outside diameter $\delta_{12b}$ of the multi-walled pipe 10b. According to this embodiment, the multi-walled pipe 10b may be easily and securely connected to the joint member 20b, if it is fitted into the short tubular member 23b.

Next, reference is made to FIGS. 3 and 4. Reference numeral 20c is a joint member consisting of a tubular part 21c, a flange 22c provided at one end of the tubular part 21c, and a tapered tubular part 24c connected to the flange 22c and provided opposite to the tubular part 21c. The tubular member 21c is so made that its inside diameter $\phi_{21c}$ and outside diameter $\delta_{21c}$ are equal to the inside diameter $\phi_{11c}$ and outside diameter $\delta_{11c}$ of the inner tubular member 11c of a multi-walled pipe 10c, respectively. The tapered tubular member 24c is so made that its inside diameter $\phi_{24c}$ is equal to the inside diameter $\phi_{11c}$ of the inner tubular member 11c of the multi-walled pipe 10c, and so that its maximum outside diameter $\delta_{24c}$ appearing at the portion where it is connected to the flange 22c may be equal to the outside diameter $\delta_{11c}$ of the inner tubular member 11c. Besides, the outside diameter $\delta_{22c}$ of the flange 22c is made equal to the outside diameter $\delta_{12c}$ of the outer tubular member 12c of the multi-walled pipe 10c. In this embodiment, the joint 20c may be connected to the multi-walled pipe 10c by inserting the tapered tubular member 24c into the inner tubular member 11c of the multi-walled pipe 10c until the flange 22c is brought into contact with one end surface of the multi-walled pipe 10c.

In the above embodiment, if the end of the inside surface of the inner tubular member 11c of the multi-walled pipe 10c is tapered towards the inside, the taper corresponding to the taper of the tapered tubular member 24c as shown in FIG. 4, the tapered tubular member 24c of the joint 20c can be inserted into the inner tubular member 11c of the multi-walled pipe 10c more easily and securely.

In addition, the embodiment shown in FIG. 4 may be modified as shown in FIG. 5. In FIG. 5, a tapered tubular section 24c' is formed integrally with a tubular section 21c' to form an insertable tubular member 24c'; and an annular member 22c' used as a flange is separately formed. In this modification, when the insertable tubular member 20c' is to be connected to a multi-walled pipe 10c', the insertable tubular member 20c' and the annular member 22c' may be assembled into a joint to be inserted in the multi-walled pipe 10c', or the annular member 22c' may be first brought into abutment with one end of the multi-walled pipe 10c' and then the insertable tubular member 20c' may be inserted into the inner tubular member 11c' of the pipe 10c' through the hole of the annular member or flange 22c'.

Figure 10:
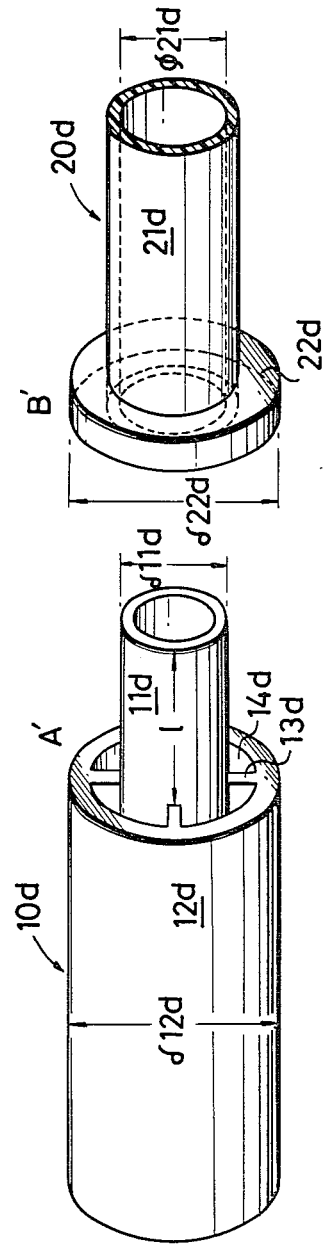
FIGS. 10 and 11 are perspective views of a thermoplastic multi-walled pipe and a joint according to still other embodiments of the present invention.

Reference is now made to FIG. 10 which is a perspective view of another embodiment of the present invention. Reference numeral 11d designates an inner tubular member of a multi-walled pipe 10d, and 12d designates an outer tubular member of the pipe 10d. The inner and outer tubular members 11d and 12d are arranged concentrically with each other by ribs 13d. In this embodiment, the outer tubular member 12d and the ribs 13d are removed by a predetermined length l in the axial direction of the pipe from one end thereof to expose the inner tubular member 11d. Reference numeral 20d is a joint consisting of a tubular part 21d and a flange 22d provided at one end of the tubular part 21d. The tubular part 21d is so formed that its inside diameter $\phi_{21d}$ is equal to the outside diameter $\delta_{11d}$ of the inner tubular member 11d of the pipe 10d. The flange 22d is so made that its outside diameter $\delta_{22d}$ is equal to the outside diameter $\delta_{12d}$ of the outer tubular member 12d of the pipe 10d.

In the above embodiment, the joint 20d is connected to the multi-walled pipe 10d as follows. The exposed portion of the inner tubular member 11d having a length l is inserted into the tubular member 21d through the flange 22d until the surface A' of the outer tubular member 12d of the multi-walled pipe 10d is brought into contact with the end surface B' of the flange 22d of the joint 20d.

The end surface A' of the outer tubular member 12d of the multi-walled pipe 10d may be bonded to the end surface B' of the joint 20d by common adhesives, heating, bolts, screws, or the like.

According to the above embodiment of the present invention, the flow of fluid through the hollow portion 14d between the inner and outer tubular members 11d and 12d can be stopped by sealing the end. Thus the heat-insulating effect can be increased after connection. The tubular member 21d of the joint 20d may be connected to other multi-walled pipes in the same manner as in the case of a joint for a single-walled pipe; therefore the connecting process can be much simpified, and it is as a matter of course that the fluid flowing in the inner tubular member 11d can be transferred to other multi-walled pipes through the tubular member 21d. just as in the case of a single-walled pipe.

Figure 11:
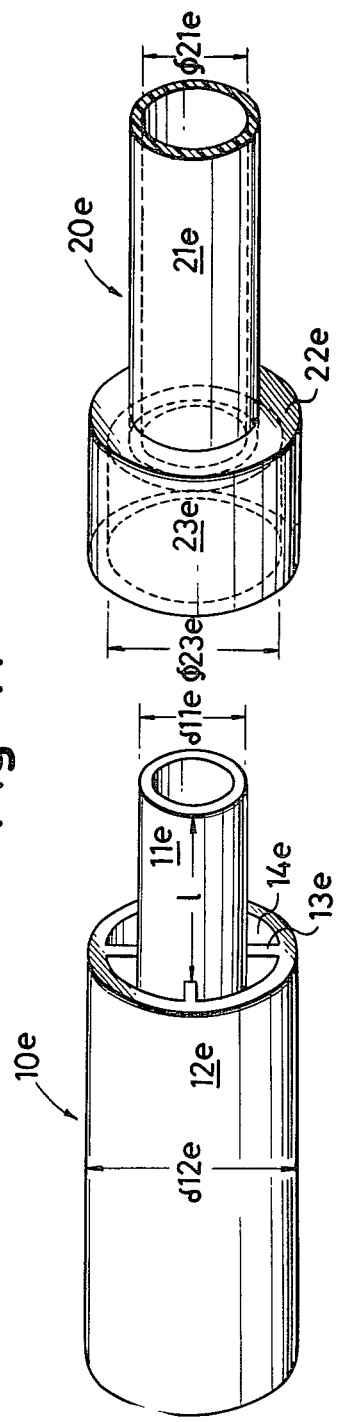

Reference is now made to FIG. 11 which is a perspective view of still another embodiment of the present invention. In the drawing, the numeral 10e designates a multi-walled pipe, 11e an inner tubular member of the pipe 10e, 12e an outer tubular member of the pipe 10e, 13e ribs for supporting the tubular members 11e and 12e, 14e a hollow portion between the tubular members 11e 11a and 12e, and 20e a joint consisting of a tubular part 21e and a flange 22e provided at the end of the tubular member 21e. The tubular part 21e is so made that its inside diameter $\phi_{21e}$ is substantially equal to the outside diameter $\delta_{11e}$ of the inner tubular member 11e of the multi-walled pipe 10e. The flange 22e is connected to a short tubular part 23e provided concentrically therewith and extended in the direction opposite to the tubular part 21e, and is so formed that its inside diameter $\phi_{23e}$ is equal to the outside diameter $\delta_{12e}$ of the outer tubular member 12e of the pipe 10e.

In the above embodiment of the present invention, the joint 20e may be easily connected to the pipe 10e, since the short tubular part 23e functions as a guide when the outer tube 12e of the multi-walled pipe 10e is inserted into the short tubular part 23e of the joint 20e.

Figure 6:
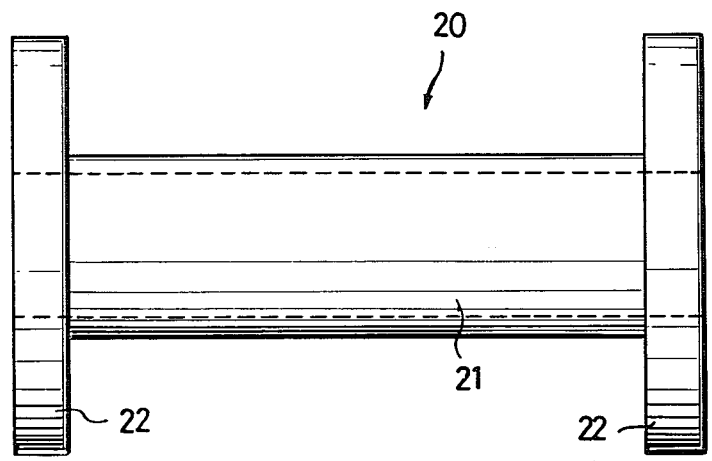
FIGS. 6 to 9 are elevational views of the joint according to various embodiments of the present invention, respectively.
Figure 7:
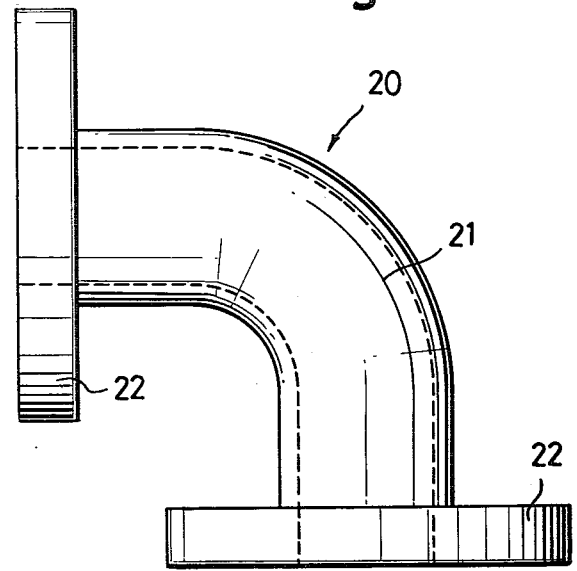
Figure 8:
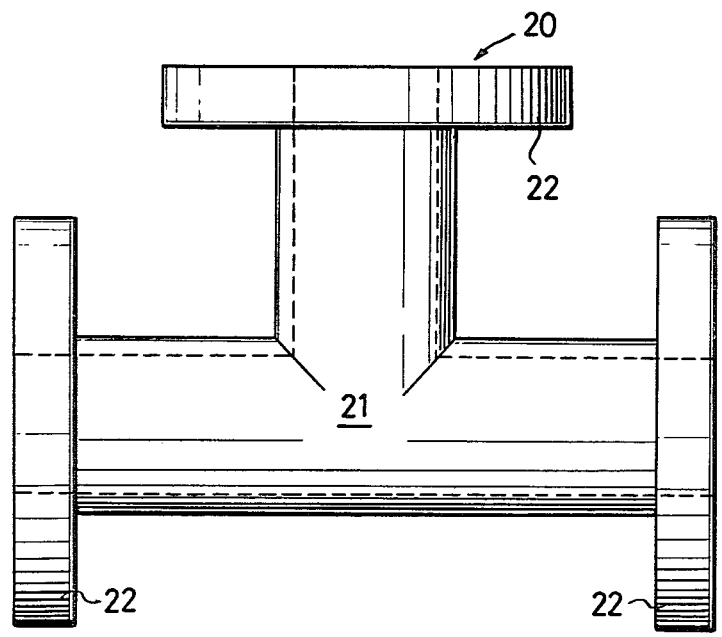

In the above-mentioned embodiments shown in FIGS. 1, 2, 3, 4, 5, 10 and 11, the joint 20 is shown as provided with a flange at one end of the tubular part 21 thereof. However, it may be provided with flanges 22 at both ends of the straight tubular part 21 as shown in FIG. 6, or at both ends of the curved tubular part 21 as shown in FIG. 7, or at three ends of the T-shaped tubular part 21 as shown in FIG. 8; thus each end of the tubular part 21 may be connected to another multi-walled pipe, or if necessary, may be connected to a single-walled pipe by removing the flange.

Figure 9:
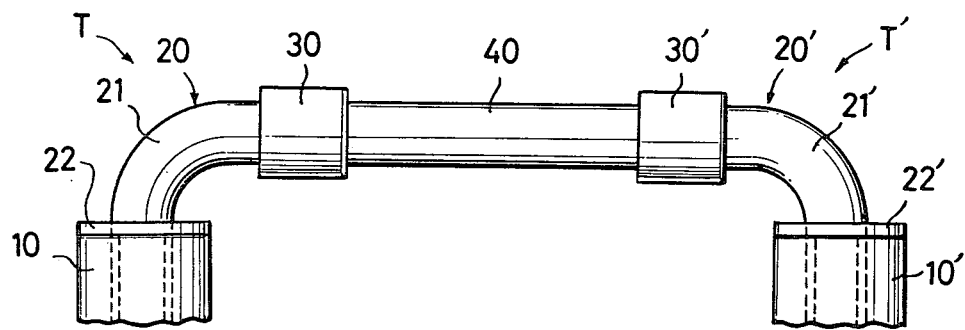

As shown in FIG. 9, in addition, the joint structure T and T' of the present invention may be arranged with a straight pipe 40, sockets 30 and 30' therebetween.

Figure 12:
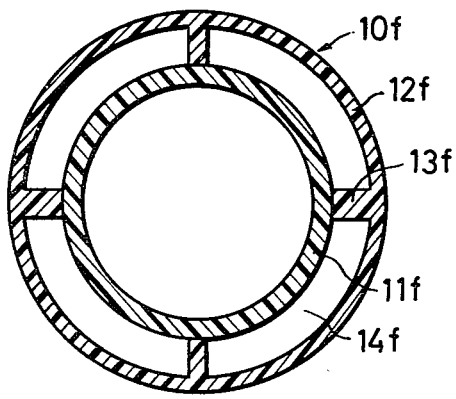
FIG. 12 is a sectional view of a multi-walled pipe according to one embodiment of the present invention.

Reference is now made to FIG. 12. In the drawing, the reference numeral 10f designates a multi-walled pipe, 11f an inner tubular member of the pipe 10f, and 12f an outer tubular member of the pipe 10f. Reference numeral 13f designates ribs for spacing the inner and outer tubular members 11f and 12f, and 14f designates a hollow portion provided between the inner and outer tubular members 11f and 12f. The rib 13f is so formed that the bond per unit area between the rib 13f and inner tubular member 11f is weaker than the bond per unit area between the rib 13b and outer tubular member 12f. Therefore, if an external force is applied to the outer tubular member 12f, the bond between the rib 13f and inner tubular member 11f tends to break. Accordingly, in the multi-walled pipe shown in this figure, when it is desired to expose the inner tubular member to a predetermined length l at its one end as shown in FIG. 10, it is easily possible to do so by notching the outer tubular member and ribs by using a simple tool and then applying an external force thereto.

The method for forming the multi-walled pipe shown in FIG. 12 is hereinafter described with reference to the drawings showing one embodiment of the present invention.

Figure 13:
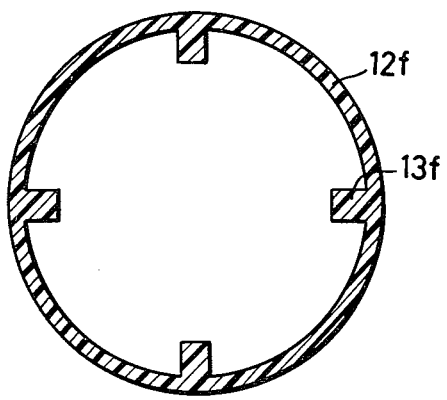
FIG. 13 is a sectional view of an outer tubular member of the multi-walled pipe of FIG. 12 during the process of forming.
Figure 14:
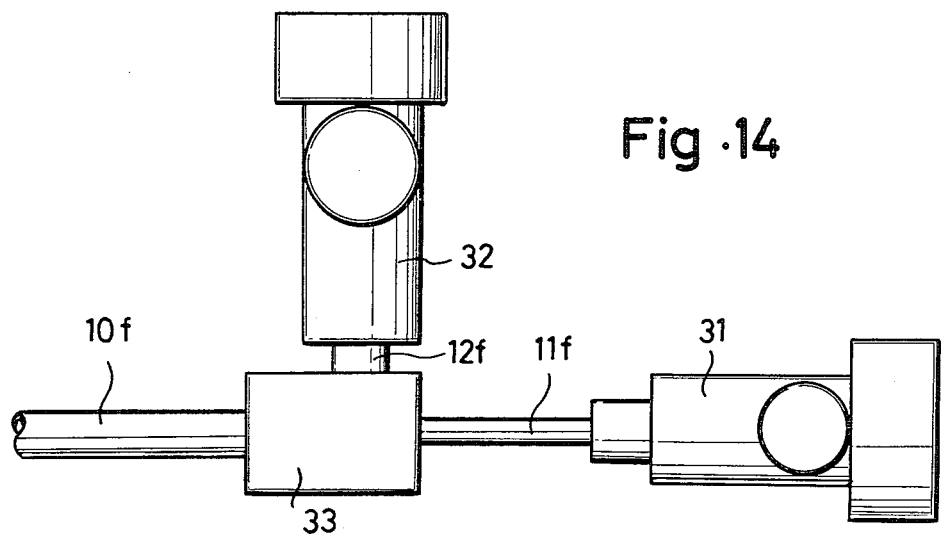
FIG. 14 is a schematic view of an apparatus for use in producing the multi-walled pipe shown in FIG. 12.

Reference is now made to FIG. 14. An inner tubular member 11f is formed by a first extruder 31 according to the method of forming a single-walled pipe. Then the inner tubular member 11f is led to a crosshead 33. On the other hand, synthetic resin material heated and mixed in a second extruder 32 is led to the crosshead 33 where the outer tubular member 12f and ribs 13f are integrally formed as shown in FIG. 13; and the ribs 13f are connected to the inner tubular member 11f also in the crosshead to form a multi-walled pipe 10f. The bond between the ribs 13f and inner tubular member 11f may be adjusted to a suitable value by selecting the material used, or the cooling time, that is, the period from the time when when the inner member 11f is formed to the time the member 11f is bonded to the ribs 13b in the crosshead 33.

Figure 15:
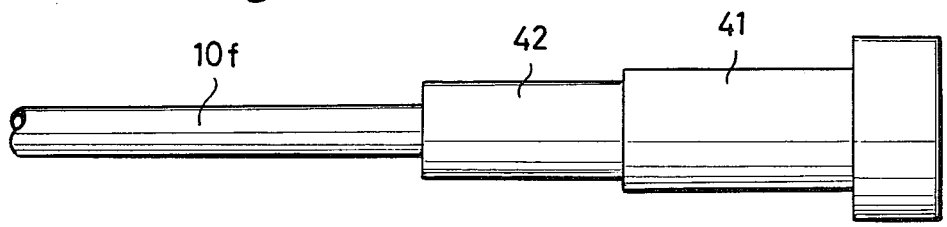
FIG. 15 is a schematic view of another apparatus for use in producing the multi-walled pipe shown in FIG. 12.

Reference is now made to FIG. 15 which is an explanatory view of an apparatus for producing another multi-walled pipe which has a weak bond between the ribs 13f and the inner tubular member 11f in a modified manner. Heated and mixed synthetic resin material is extruded by an extruder 41 into a multi-walled pipe forming die 42 where the synthetic resin material is divided into two streams, which are separately extruded from the die 42, one of which is formed into a semiproduct integrally containing the ribs and outer tubular member as shown in FIG. 13, and the outer into a semiproduct providing the inner tubular member, then both semiproducts are extruded from the die 42.

Figure 16:
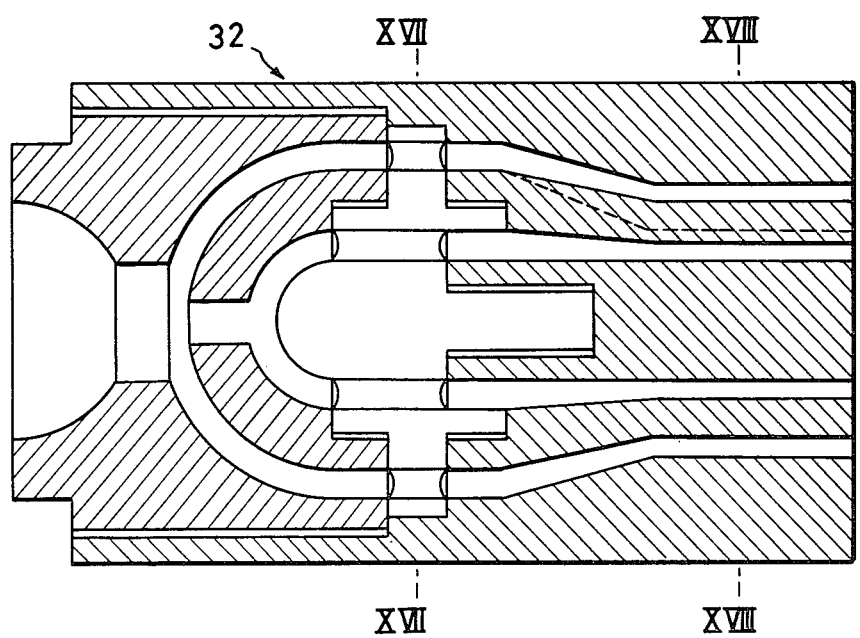
FIG. 16 is a sectional view of a die for use with the apparatus shown in FIG. 14.
Figure 17:
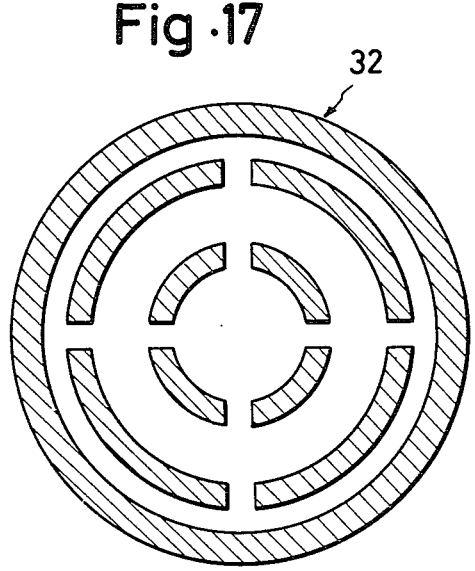
FIGS. 17 and 18 are sectional views taken along Line XVII—XVII' and Line XVIII—XVIII' of FIG. 16, respectively.
Figure 18:
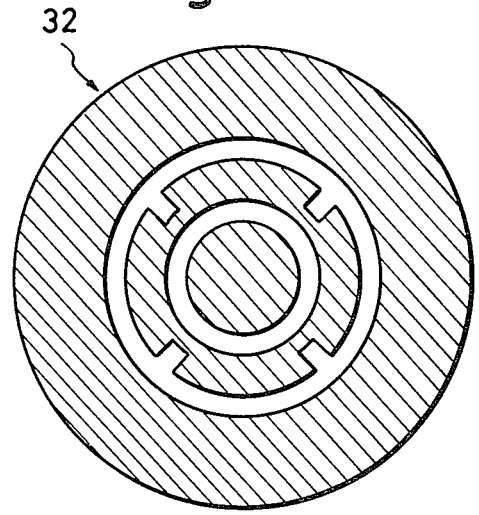

The cross sections of the die 42 are shown in FIGS. 16, 17 and 18.

The strength of the bond between the rib and inner tubular member is chiefly determined by the temperatures of the one-piece semiproduct of the ribs and outer tubular member and by the melting temperature of the inner tubular molded member to bond itself to the one-piece semiproduct, respectively. In other words, the bonding force or strength decreases as the one-piece semiproduct of the ribs and outer tubular member decreases, and therefore the inner and outer tubular member of the resultant multi-walled pipe are easily separated by an external force.

Figure 19:
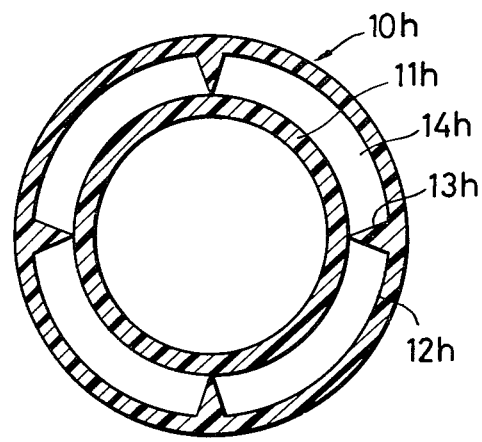
FIGS. 19, 20 and 21 are sectional views of the multi-walled pipes of the present invention, respectively.

Reference is now made to FIG. 19, which shows another example of the multi-walled pipe having inner and outer tubular members that can be easily separated. Reference numeral 10h designates a multi-walled pipe, 11h an inner tubular member of the pipe 10h, 12h an outer tubular member of the pipe 10h, and 13h ribs for supporting the inner and outer tubular members 11h and 12h. The rib 13h is so formed that the contact area between the rib 13h and outer tubular member 12h is greater than that between the rib 13h and inner tubular member 11h. In this example, the multi-walled pipe does not require temperature conditions so severe temperature conditions for bonding operation as compared with the pipe shown in FIG. 12; therefore it can be produced very easily.

Figure 20:
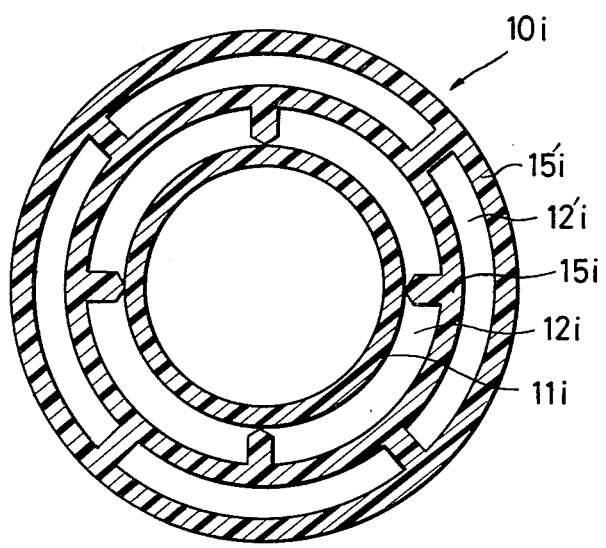

In the example of FIG. 19, the multi-walled pipe is shown as doubled-walled pipe; on the other hand, a triple-walled pipe is shown in FIG. 20 and such pipe may be produced in a manner similar to that of the above production.

Figure 21:
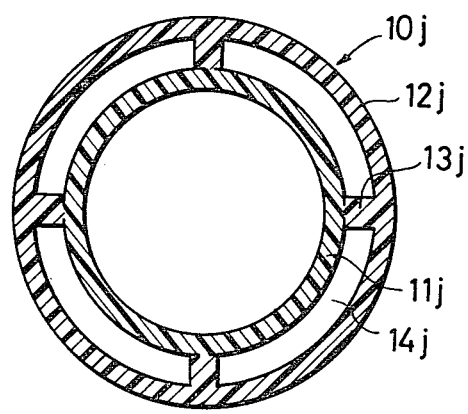

Reference is now made to FIG. 21, which shows still another example of the multi-walled pipe having inner and outer tubular members. In this case, notches are provided between the ribs 13j and the inner member 11j so that the separation of the ribs and the inner member will be done more easily.

In FIG. 21, a multi-walled pipe 10j consists of an inner tubular member 11j, an outer tubular member 12j, and ribs 13j for spacing the inner and outer tubular members 11j and 12j. The rib 13j is welded perfectly to the outer tubular member 12j, but not completely to the inner tubular member 11j. For instance, the rib 13j is partly spot-welded to the outer surface of the inner tubular member 11j, therefore application of an external force to the multi-walled pipe 10j will easily cause the inner tubular member 11j to separate from the outer tubular member 12j at the above spot-welded portions.

Figure 22:
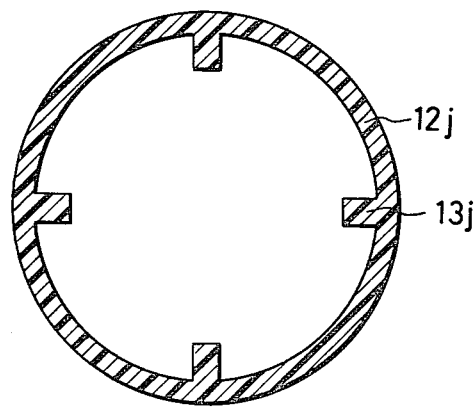
FIG. 22 is a sectional view of an outer tubular member of the multi-walled pipe of FIG. 21 during the process of forming.
Figure 23:
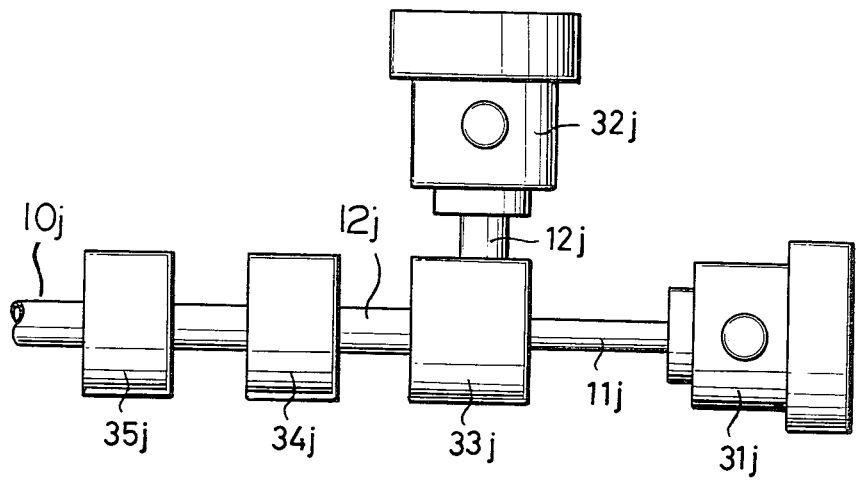
FIG. 23 is a schematical view of an apparatus for use in producing the multi-walled pipe shown in FIG. 21.

Reference is now made to FIG. 23, which is a schematic view of an apparatus for forming the multi-walled pipe shown in FIG. 21. A first extruder 31j extrudes an inner tubular member 11j according to the usual method of forming single-walled pipes. The inner tubular member 11j is led to a crosshead 33j. On the other hand, synthetic resin material heated and mixed in a second extruder 32j is led to the crosshead 33j to extrude a one-piece semiproduct integrally containing the outer tubular member 12j and ribs 13j as shown in FIG. 22. In the crosshead 33j, the outside surface of the inner tubular member 11j is brought into contact with the ribs 13j, and a multi-walled semiproduct pipe 10j whose ribs 13j are not welded to the inner tubular member 11j and hollow portions 14j are formed between the inner and outer tubular members 11j and 12j, is first extruded. Then, this multi-walled semiproduct pipe 10j is cooled in a cooling device 34j before the outside surface of the inner tubular member 11j is spot welded to the inside ends of the ribs 13j by a welder 35j for forming a multi-walled pipe 10j of the present invention.

Figure 24:
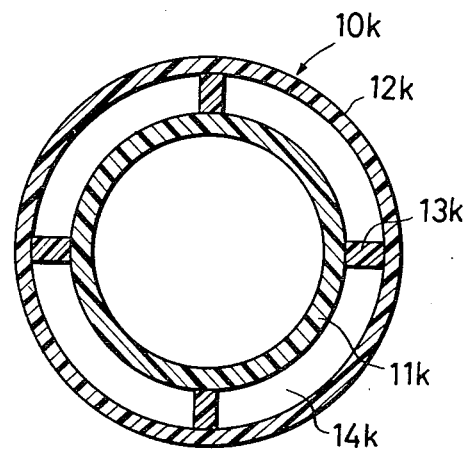
FIG. 24 is a sectional view of a multi-walled pipe for use with an embodiment of the present invention.

Reference is now made to FIG. 24 which is a sectional view of still another example of the multi-walled pipe having inner and outer tubular members that can be easily separated.

In FIG. 24, the reference numeral 10k is another multi-walled pipe, 11k an inner tubular member of the pipe 10k, 12k an outer tubular member of the pipe 10k, and 13k ribs for spacing the inner and outer tubular members 11k and 12k. The rib 13k is weakly bonded both to the outside surface of the inner tubular member 11k and to the inside surface of the outer tubular member 12k. In this example, therefore, the outer tubular member may be separated from the inner tubular member by the action of a very small force; thus the multi-walled pipe can be stripped of a predetermined length of the outer tubular member to expose the corresponding length of the inner tubular member and, in addition, may be easily connected to the joint members shown in FIGS. 10 and 11.

Figure 26:
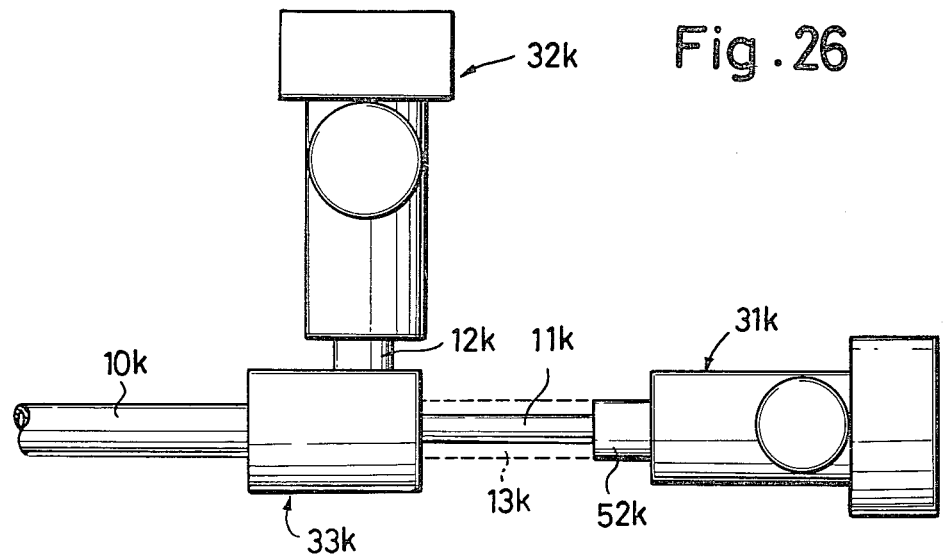
FIG. 26 is a schematical view of an apparatus for use in producing the multi-walled pipe shown in FIG. 24.

Reference is now made to FIG. 26, which shows an example of the apparatus for producing the multi-walled pipe shown in FIG. 24.

Figure 25:
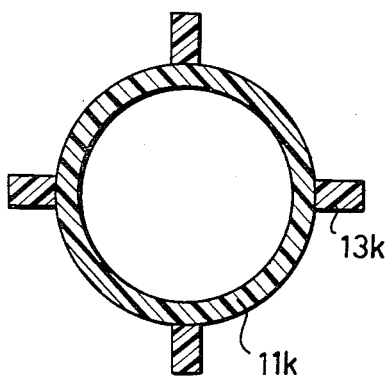
FIG. 25 is a sectional view of an innermost tubular member of the multi-walled pipe of FIG. 24 during the process of forming.
Figure 27:
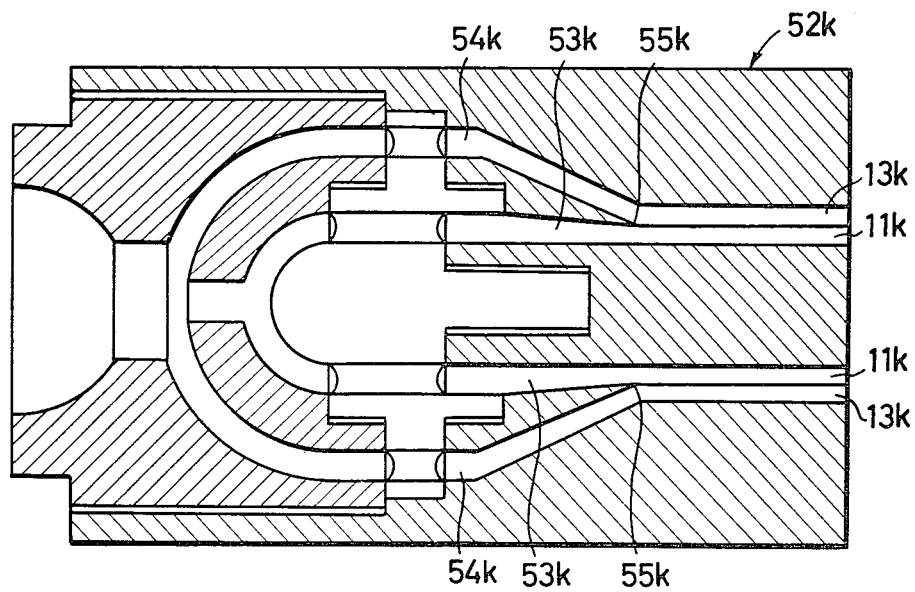
FIG. 27 is a sectional view of a die for use in the first extrusion process performed by the apparatus shown in FIG. 26.

In FIG. 26, a first extruder 31k extrudes an inner tubular member 11k on the outside surface of which ribs 13k are provided as shown in FIG. 25. The die 52k of the first extruder 31k may be constructed as shown in FIG. 27; in the die 52k, there are provided two passages for synthetic resin material, that is, a passage 53k for the molten resin to be formed into the inner tubular member 11k and a passage 54k for the molten resin to be formed into the ribs 13k; molten resin is formed into the desired shape while passing through the respective passages of the die 52k; the respective formed semiproducts are then cooled to desired temperatures and are brought into contact with each other after passing through a connecting point 55k; thus a one-piece product consisting of the inner tubular member 11k and ribs 13k having a cross section as shown in FIG. 25 is formed. On the other hand, the second extruder 32k forms hot resin into an outer tubular member 12k and extrudes it into a crosshead 33k, where the outer tubular member 12k is weakly bonded to the ribs 13k of the one piece product to obtain a final multi-walled pipe 10k.

If the weak-bond temperature is properly selected at a temperature between the forming temperature and the melting temperature of resin depending upon the kinds of the resin used, the inner and outer tubular members may be easily separated from each other, and the structural strength of the multi-walled pipe will not be impaired.

In the above example, the inner and outer tubular members of the multi-walled pipe can be easily separated with a simple portable tool to expose the inner tubular member at a predetermined portion thereby making it possible to use the joint of the present invention.

The joint structure of the present invention is made of synthetic resin, including polyvinyl chloride, polyethylene, etc.

The multi-walled pipe for use in the present invention may be formed of one or a plurality of synthetic resins. For instance, the ribs and the outer tubular member may be formed of high-density polyethylene, and the inner tubular member may be formed of hard polyvinyl chloride; in this case, the temperatures of the different resins at the time when they are brought into contact may be controlled in consideration of their respective melting points and thereby the strength of the bond between the ribs 13 and the inner tubular member 11 can be easily adjusted to a desirable value.

The embodiments of the invention in which an exclusive property or privilege is claimed are defined as follows:

1. A process for producing joinable thermoplastic multi-walled pipes each of said thermoplastic multi-walled pipes having at least two tubular members different in inside diameter and arranged concentrically with a hollow portion therebetween, a plurality of longitudinally extending ribs spacing adjacent ones of said tubular members, and the bond per unit area being weaker at the portion where the rib contacts the inner tubular member than at the portion where the rib contacts the outer tubular member, said process comprising the steps of extruding molten thermoplastic resin from a first extruder provided with a die similar in cross section to an innermost tubular member thereby obtaining a first formed product having a cross section of said innermost tubular member; thereafter separately extruding molten thermoplastic resin over said innermost tubular member from a second extruder longitudinally spaced from said first extruder in the direction of extrusion of the first formed product provided with a die similar in cross section to the combined form of outer one of said tubular members and ribs of said multi-walled pipe thereby obtaining a second formed product having a cross section of the combined form of said outer tubular member and ribs of the multi-walled pipe; and joining the second formed product to the first formed product concentrically with each other in bonds between said ribs and said inner tubular member which are weaker per unit area than the connections between said ribs and said outer tubular member.

2. A process for producing a thermoplastic multi-walled pipe according to claim 1, wherein said step of joining the first and second formed products concentrically with each other is carried out after the temperature of the first formed product has decreased below its extrusion temperature.

3. A process for producing a thermoplastic multi-walled pipe according to claim 1, wherein said step of joining the first and second formed products concentrically with each other is carried out by welding incompletely the outside surface of the inner tubular member to the radially inner edge surfaces of the ribs.

4. A process for producing a thermoplastic multi-walled pipe according to claim 1, wherein the thermoplastic resin extruded from said second extruder is different in kind from the thermoplastic resin extruded from said first extruder.

5. A process for producing a thermoplastic multi-walled pipe, according to claim 1, wherein each rib is triangular in section with the maximum section of each rib being connected with the inner surface of the outer tubular member and the apex of the rib is connected to the outer surface of the inner tubular member.

6. A process for producing a thermoplastic multi-walled pipe according to claim 1 wherein the cross section of each rib is a polygon and one side of the polygon of each rib is integrated with the inner surface of the outer tubular member and the opposite side of the polygon of each rib is contacted with the outer surface of the inner tubular member.

7. A process for producing a thermoplastic multi-walled pipe according to claim 1, wherein said pipe is formed with only one second formed product.

8. A process for producing a thermoplastic multi-walled pipe according to claim 1, wherein a third extruder extrudes another of second formed products on the outer surface of the first mentioned of said second formed products.

* * * * *